Feb. 10. 1925.　　　　　　　　　　　　　　　　1,526,286
L. A. HORNBURG
COUPLING DEVICE FOR TRAIN TELEPHONE SYSTEMS
Filed Aug. 6, 1921　　　　3 Sheets-Sheet 1

Inventor
L. A. Hornburg
By Victor J. Evans
Attorney

Feb. 10, 1925.  
L. A. HORNBURG  
1,526,286  
COUPLING DEVICE FOR TRAIN TELEPHONE SYSTEMS  
Filed Aug. 6, 1921  
3 Sheets-Sheet 2
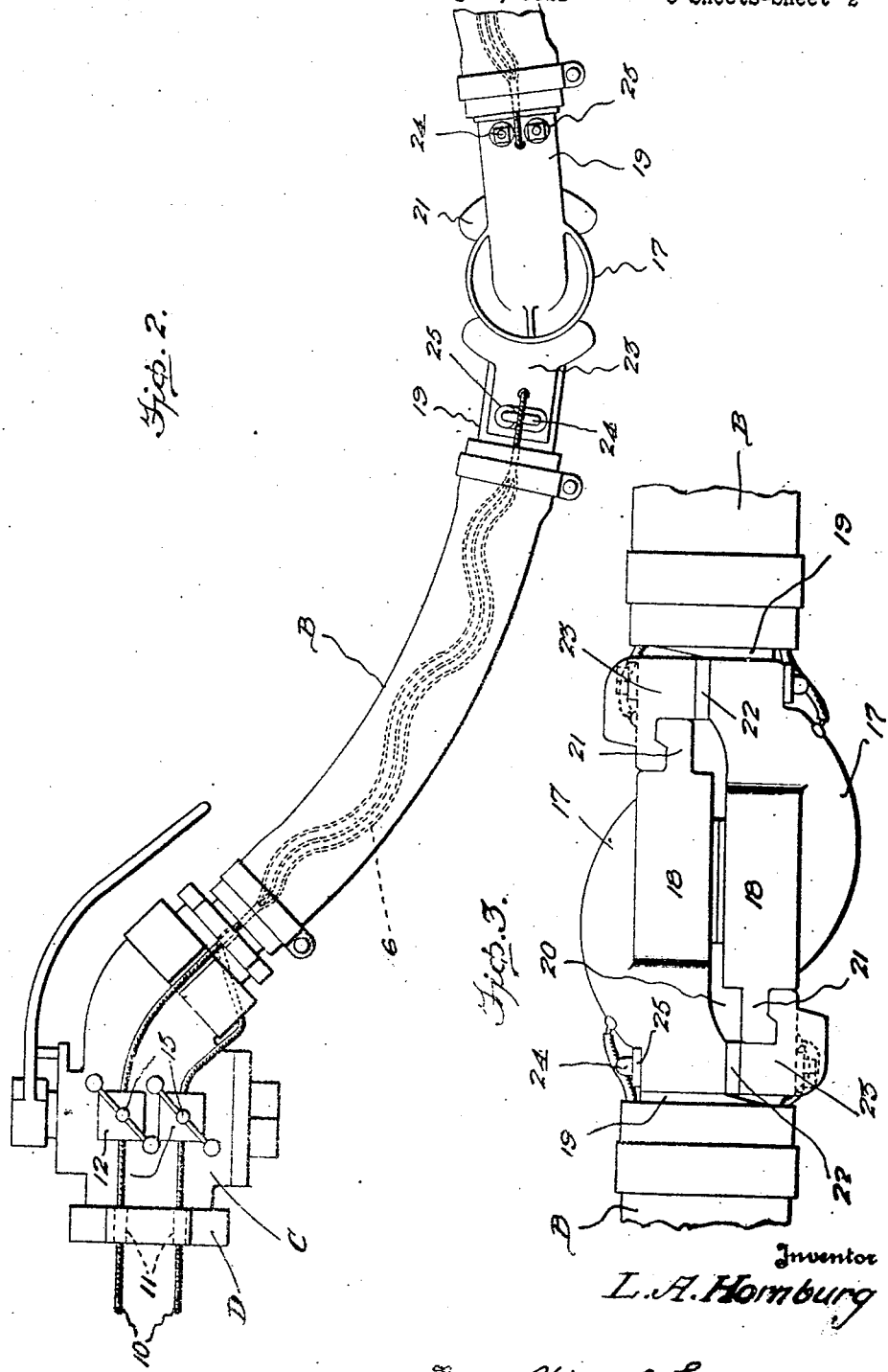
Inventor  
L. A. Hornburg  
By Victor J. Evans  
Attorney

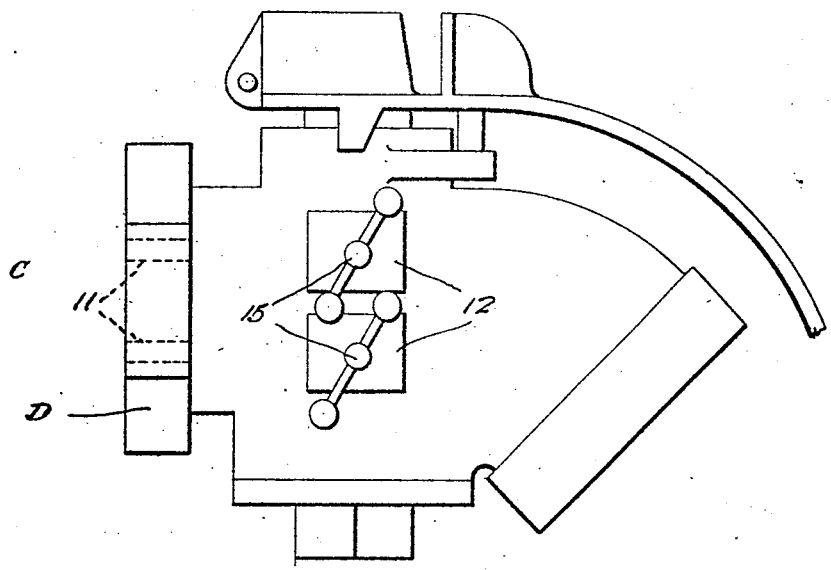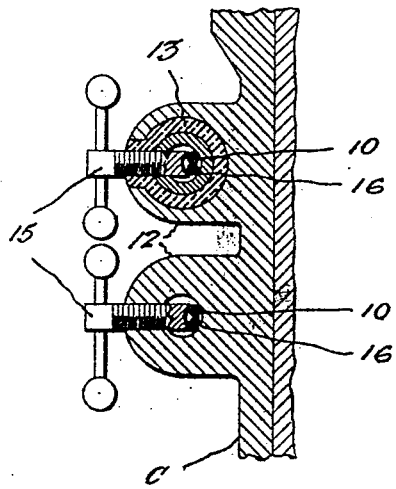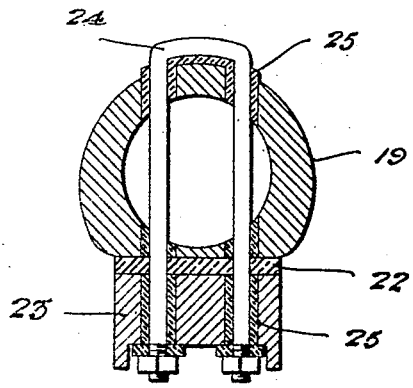

Patented Feb. 10, 1925.

1,526,286

UNITED STATES PATENT OFFICE.

LOUIS A. HORNBURG, OF OMAHA, NEBRASKA.

COUPLING DEVICE FOR TRAIN-TELEPHONE SYSTEMS

Application filed August 6, 1921. Serial No. 490,257.

*To all whom it may concern:*

Be it known that I, LOUIS A. HORNBURG, a citizen of the United States, residing at Omaha, in the county of Douglas and State of Nebraska, have invented new and useful Improvements in Coupling Devices for Train-Telephone Systems, of which the following is a specification.

This invention relates to telephone systems used on trains and has for its object the provision of a novel coupling for connecting the telephone wires between successive cars or between the locomotive and the adjacent car, the arrangement being such that when the air hose at the meeting ends of cars is connected electrical connection will also be made of the telephone wires whereby there will be a continuous circuit.

An important and more specific object is the provision of a coupling which may be constructed by modifying the already existing coupling devices of air hose or which may be built as an entirely new structure, it being one of the features that certain of the parts of the air hose coupling be insulated from one another whereby a proper circuit may be effected.

An additional object is the provision of a coupling means of this character which will be simple and inexpensive in manufacture and installation, highly efficient in use, durable in service, and a general improvement in the art.

With the above and other objects and advantages in view, the invention consists in the details of construction to be hereinafter more fully described and claimed and illustrated in the accompanying drawings in which—

Figure 1:
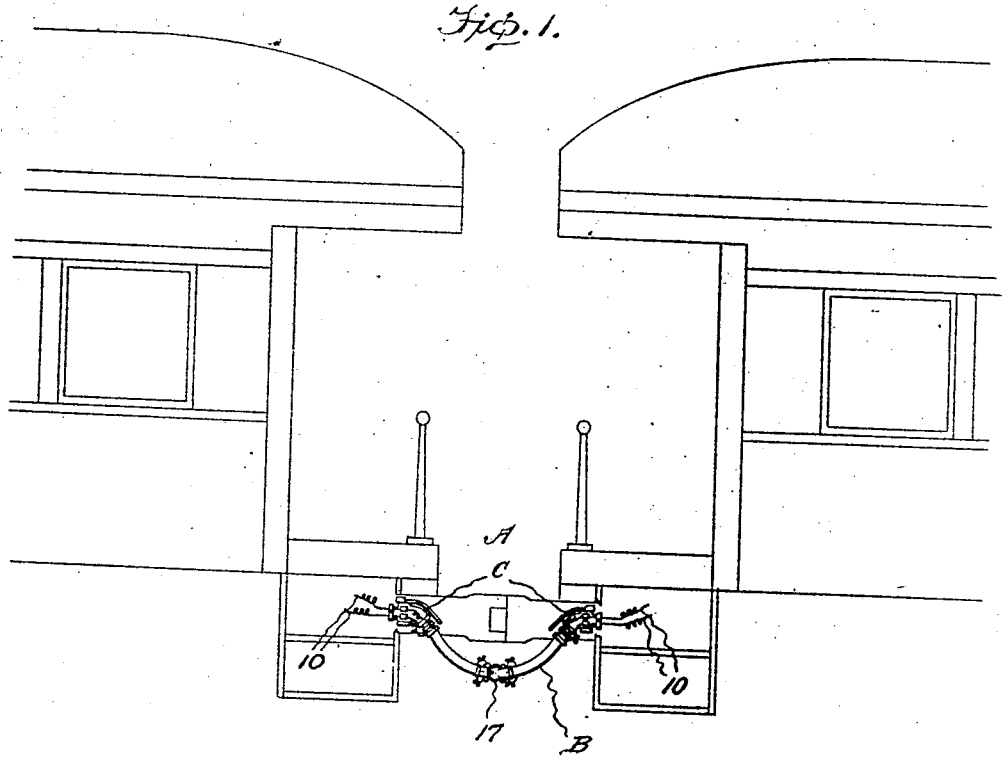
Figure 6:
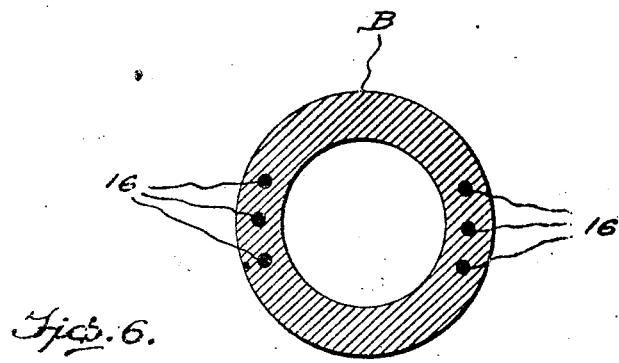

Figure 1 is a fragmentary side elevation of the meeting ends of railway cars having an air brake hose connection constructed in accordance with my invention, Figure 2 is an enlarged elevation showing the couplings engaged, Figure 3 is an elevation taken at right angles to Figure 2, Figure 4 is an enlarged elevation showing one side of the angle cock, Figure 5 is a cross sectional view through the angle cock, Figure 6 is a cross sectional view through the novel air hose, and Fig. 7 is a sectional view through the coupling.

Referring more particularly to the drawings, the letter A designates the meeting ends of cars. B designates the air hose, and C designates the angle cock which is connected with the train line and with which the air hose is connected.

In carrying out my invention I provide two insulated wires 10 which are led along under each car and which are mounted in any preferred or suitable way. The angle cock has its flanged portion D formed with two spaced holes 11 for the passage of the wires 10. Welded or otherwise secured, or formed, if preferred, upon one side of the angle cock, are tubular brackets 12 within each of which is disposed a sleeve 13 being held in position by an aluminum screw 15 which is threaded into the bracket 12. This screw is so formed that it will sink into the wires and make good contact without scraping the wires. The distance between the brackets is a matter of no consequence and depends to a great extent upon choice. The air hose B is of course connected with this angle cock in the usual manner, as shown.

Instead, however, of using the ordinary air hose I make use of an air hose within the walls of which are embedded wires 16 which are effectually insulated from one another owing to the fact that the hose itself is constructed of rubber. The wires are of the flexible cord type, having many strands so that they will stand repeated bending.

The numeral 17 designates the clamping elements which are carried by the ends of the hose sections. Ordinarily such a clamping element is formed of one piece of metal and includes a head apertured for the passage of compressed air and having a cam-like clamping member, these cam-like clamping members cooperate to hold firmly in unlocked relation. In carrying out my invention it is necessary to form each clamping element 17 of separate sections both of which are metallic and both of which are preferably constructed of aluminum as this metal is a good conductor and does not corrode or rust. The clamping member includes the body portion 18 of substantially circular form having a neck 19 with which the hose section is connected, the body furthermore being provided with an opening 20 surrounded by a flange 21. Insulated from the body 18 by a strip of fiber 22 or the like, is the cam-like clamping element 23 which is secured to the body by means of a suitable U-bolt 24 which must be insulated either from the body or from the cam member 23 and such insulation may be readily effected by means of fiber insulating washers 25.

In the use of my device it will be seen that one hose section is connected with the angle cock C in the ordinary manner, the wires which are embedded within the hose passing through the hose 11 in the angle cock and being connected within the metal sleeves 14 held within the brackets 12. Of course the wires which run beneath the car are also secured within these metal sleeves. The coupling or clamping elements 17 are engaged in exactly the same manner as ordinarily with the cam members 23 of each cooperating with the body of the other for holding the members together. Owing to the fact that each clamping member or coupling member 17 is formed of the two insulated member portions which are connected with the adjacent ends of the embedded wires, it will be seen that a complete circuit will be maintained without any danger of either short circuiting or grounding of the current.

From the foregoing description and a study of the drawings it will be apparent that I have thus provided a simply constructed and consequently inexpensive coupling device by means of which the telephone wires in a train telephone system may be connected simultaneously with the coupling of the air-brake hose, no special attention whatever being necessary other than to couple up the air line. By constructing the parts mentioned of aluminum or other similar non-corrosive material, it will be apparent that good connection should always be had without any necessity for scraping or cleaning the contacting faces of the metal parts.

While I have shown and described the preferred embodiment of my invention, it is of course to be understood that I reserve the right to make such changes in the form, construction and arrangement of parts as will not depart from the spirit of the invention or the scope of the subjoined claim.

Having thus described my invention, I claim:

Means for connecting current carrying wires of an electrical system on a train, at the point of coupling of the air line hose of the respective cars of a train; comprising metallic members secured upon and insulated from the air hose coupling elements and connected electrically with the respective wires, said metallic members engaging when the air hose coupling elements are connected, said metallic elements being spaced from the coupling elements by insulating material, and U-bolts passing through the coupling elements and through the metallic members and insulated from the latter, a U-shaped bushing in the coupling element at the bight portion of the U-bolt, and other bushings surrounding the arms of the U-bolt within the coupling element and within the metallic member.

In testimony whereof I affix my signature.

LOUIS A. HORNBURG.